United States Patent
Ohshita

[11] Patent Number: 5,161,065
[45] Date of Patent: Nov. 3, 1992

[54] BEHIND STOP WIDE ANGLE LENS SYSTEM

[75] Inventor: Koichi Ohshita, Tokyo, Japan

[73] Assignee: Nikon Corporation, Tokyo, Japan

[21] Appl. No.: 830,452

[22] Filed: Feb. 5, 1992

Related U.S. Application Data

[63] Continuation of Ser. No. 680,252, Apr. 4, 1991, abandoned.

[30] Foreign Application Priority Data

Apr. 25, 1990 [JP] Japan .................. 2-109292

[51] Int. Cl.$^5$ .................................. G02B 9/18
[52] U.S. Cl. ........................ 359/739; 359/785
[58] Field of Search ............ 359/739, 740, 785, 781, 359/672, 673, 674, 675

[56] References Cited

FOREIGN PATENT DOCUMENTS 58-166314  10/1983  Japan .
60-258510  12/1985  Japan .
62-56916    3/1987  Japan .

Primary Examiner—Paul M. Dzierzynski
Assistant Examiner—Hung X. Dang
Attorney, Agent, or Firm—Shapiro and Shapiro

[57] ABSTRACT

There is provided a behind stop wide angle lens system which comprises a positive lens $L_1$ formed by joining a negative meniscus lens $L_{11}$ whose convex surface faces an object and a positive meniscus lens $L_{12}$ whose convex surface similarly faces the object, a biconcave negative lens $L_2$, a biconvex positive lens $L_3$ and an aperture stop S, disposed in this order from the side of the object. The behind stop wide angle camera achieves a wider angle of view and has an excellent imaging performance in spite of a simple structure and a compact size thereof.

4 Claims, 2 Drawing Sheets

BEHIND STOP WIDE ANGLE LENS SYSTEM

This is a continuation of application Ser. No. 680,252 filed Apr. 4, 1991, now abandoned.

BACKGROUND OF THE INVENTION

1. Field of the Invention

The present invention relates to a wide angle picture-taking lens which is extremely compact and suitable for a lens shutter camera and the like.

2. Related Background Art

As a conventional picture-taking lens for use in a lens shutter camera, a behind stop triplet lens and a behind stop Tessar-type lens are well known. Since a lens system of these lenses is compact and composed of a small number of component lenses, three to four, imaging performance thereof is high and it is easy to attach a rear converter at the rear thereof. The lenses are therefore widely used at present.

In recent years, the demand for a wider angle of view has been also increased in the lens shutter camera.

Upon considering the demand, it is not possible to miss a latent demand for a compact camera in addition to a demand for what is called a wide angle photography.

In other words, if lenses which are the same in telephoto ratio (total length of lens/focal length) and different in angle of view are compared with each other, the lense which has the wider angle of view can have the shorter focal length with respect to the same picture size. Therefore, even if the lenses have the same telephoto ratio, the lens having the wider angle of view can be made more compact when being actually incorporated into a camera.

In short, it is possible to realize a wide angle lens and a compact camera.

However, the angle of view of the above triplet or Tessar lense is at most 65° and it is difficult to say that the angle of the lense is sufficiently wide.

On the other hand, as a typical wide angle lens, what is called a Biogon-type lens and a retrofocus type lens for a single-lens reflex camera are well known.

However, since the structure of these lenses is complicated and large, and it is likely that the wider the angle of the lens, the larger will be the lens system thereof, these lenses are not suitable as a lens for a lens shutter camera which is required to be compact. Furthermore, it is difficult to attach a rear converter lens to achieve multiple focuses thereon.

SUMMARY OF THE INVENTION

With the above problems in view, an object of the present invention is to provide a behind stop wide angle lens which has a simple structure and a compact shape, achieves a wider angle of view, and has an excellent imaging performance.

In order to solve the above problems, a behind stop wide angle lens system of the present invention comprises a positive lens $L_1$ formed by joining a negative meniscus lens $L_{11}$ whose convex surface faces an object and a positive meniscus lens $L_{12}$ whose convex surface similarly faces the object, a biconcave negative lens $L_2$, a biconvex positive lens $L_3$ and an aperture stop S, disposed in this order from the side of the object, and meets the following conditions:

$$0.27f < \Sigma d < 0.37f \quad (1)$$

$$2.6 < f_1/f_3 < 4.0 \quad (2)$$

$$3.8 < d_3/d_5 < 5.5 \quad (3)$$

$$0.2 < \Sigma N_p - \Sigma N_n < 0.35 \quad (4)$$

f, $f_1$ and $f_3$ designate the focal length of the whole system, the focal length of the joint lens $L_1$ and the focal length of the biconvex positive lens $L_3$, respectively. $\Sigma d$, $d_3$, $d_5$, $\Sigma N_p$ and $\Sigma N_n$ designate the distance between a surface in the lens system nearest to the object and a surface nearest to an image along the optical axis, the axial air space between the joint lens $L_1$ and the biconcave negative lens $L_2$, the axial air space between the biconcave negative lens $L_2$ and the biconvex positive lens $L_3$, the total refractive index of the positive lenses in the lens system, and the total refractive index of the negative lenses in the lens system, respectively.

DESCRIPTION OF THE PREFERRED EMBODIMENTS

Figure 1:
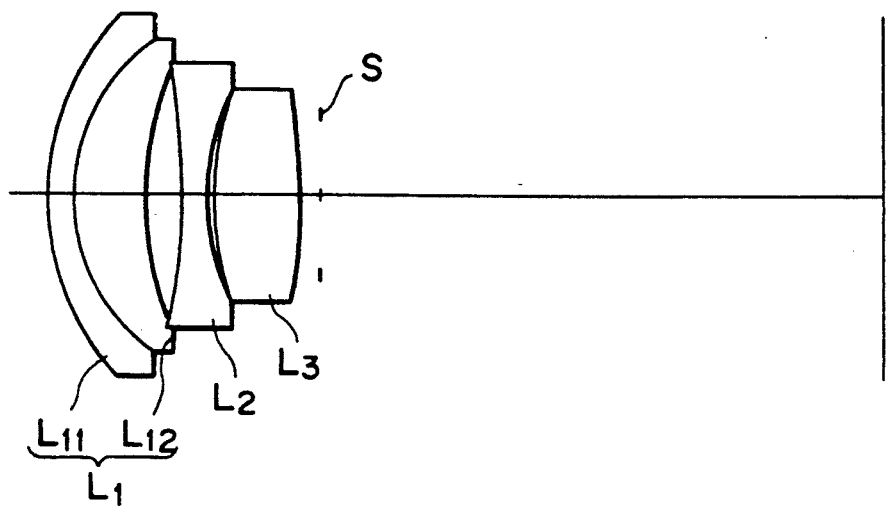
FIGS. 1, 2, 3 and 4 are construction views of lenses according to first, second, third and fourth embodiments of the present invention, respectively.

In the case of a conventional behind stop triplet lens, the correction of astigmatism is not sufficient, and the marginal illumination is small since the behind stop is adopted.

Therefore, even if the angle of view of the lens is widened in this state, the marginal ray does not pass or a serious astigmatism is caused, and it is extremely difficult to widen the angle of view.

According to a lens of the present invention, since a basic structure of a conventional triplet lens is adopted, a positive lens $L_1$, nearest to the object, is a joint lens of a negative lens and a positive lens, and the structure thereof meets the conditional expressions (1) to (4), it is possible to solve all problems of the triplet lens and achieve the object of the present invention.

By setting the conditional expressions (1) and (2), a sufficient marginal illumination is secured and the correction of astigmatism over a wide angle of view is achieved. The total thickness of the lens system (the distance between a top of a first surface and a top of a final surface along the optical axis) is large over the upper limit in the conditional expression (1). Therefore, if an attempt is made to make the lens system compact, it is difficult to secure the marginal illumination, and if an attempt is made to secure a sufficient marginal illumination, the lens system becomes large. Furthermore, the correction of the astigmatism with respect to an incident ray having a wide angle of view is difficult. On the contrary, under the lower limit of the conditional expression (1), it is difficult to correct comatic aberration over the wide angle of view.

The conditional expression (2) provides the optimal ratio of the focal length of the joint lens $L_1$ having the positive refractive power in the lens system and the biconvex positive lens $L_3$. By setting this value relatively large, it is possible to achieve a good correction of astigmatism. Under the lower limit of the conditional expression (2), it is difficult to correct the astigmatism in the wide angle of view. On the contrary, over the upper limit of the conditional expression (2), since the positive refractive power of the joint lens $L_1$ is weakened, negative distortion with respect to a ray at a wide angle of view is remarkably caused. It is desirable that the upper limit of the conditional expression (2) be 3.1.

The conditional expression (3) relates to the correction of distortion. Since the positive refractive power of the joint lens $L_1$ is small in the lens system of the present invention, an appropriate balance of the distortion is obtained by making the air space between the joint lens $L_1$ and the biconcave negative lens $L_2$ relatively long and the air space between the biconcave negative lens $L_2$ and the biconvex lens $L_3$ short. The balance of the distortion is lost both over the upper limit and under the lower limit of the conditional expression (3).

The conditional expression (4) determines the difference between the total refractive powers of the positive lenses and the negative lenses constituting the lens system, and provides a proper Petzval sum. In order to make the value of the Petzval sum small and restrain curvature of image in the triplet lens, it is necessary to make the refractive power of the biconcave negative lens $L_2$ large. However, since an enormous astigmatism is caused with respect to a ray from the wide angle of view, it is difficult to achieve a wider angle of view. Therefore, it is necessary to select a proper glass material as shown in the conditional expression (4) in order to make the Petzval sum small without increasing the refractive power of the biconcave negative lens $L_2$.

Under the lower limit of the conditional expression (4), the Petzval sum is large and the curvature of image is difficult to be corrected. On the contrary, over the upper limit of the conditional expression (4), since a glass having a high refractive index is used for the positive lens, the cost is increased.

At this time, it is desirable that the negative lens $L_{11}$ on the side of the object be made of a glass having a low refractive index and the positive lens $L_{12}$ on the side of the image be made of a glass having a high refractive index, which constitute the joint lens $L_1$, and that the refractive index of the biconvex positive lens $L_3$ is higher than that of the biconcave negative lens $L_2$.

In order to secure abundant marginal illumination in a compact lens system, it is desirable that the spaces between the lenses be short as shown in the conditional expression (1). However, it is desirable that the axial air space $d_5$ between the biconcave negative lens $L_2$ and the biconvex positive lens $L_3$ meets the following condition:

$$d_5 < 0.015f \tag{5}$$

It is difficult to secure the marginal illumination over the upper limit of the conditional expression (5).

Furthermore, in order to correct the astigmatism with a good balance, it is desirable to meet the following condition:

$$0.7 < r_1/r_3 < 0.8 \tag{6}$$

$r_1$ and $r_3$ designate the radii of curvature of the object side surface and the image side surface of the joint lens $L_1$, respectively. A tangential image surface positively curves with respect to a sagital image surface over the upper limit of the conditional expression (6), and on the contrary, the tangential image surface negatively curves with respect to the sagital image surface under the lower limit of the conditional expression (6), and that is not preferable.

Furthermore, in order to achieve a sufficient aberration correction, it is desirable to meet the following conditions:

$$1.1 < r_4/r_7 < 1.3 \tag{7}$$

$$0.12 < d_{12}/f < 0.14 \tag{8}$$

$$0.07 < d_6/f < 0.14 \tag{9}$$

$$11 < \nu_2 - \nu_4 < 20 \tag{10}$$

$f$, $r_4$ and $r_7$ designate the focal length of the whole system, the radius of curvature of the object side surface of the biconcave negative lens $L_2$, and the radius of curvature of the image side surface of the biconvex positive lens $L_3$, respectively. $d_{12}$, $d_6$, $\nu_2$ and $\nu_4$ designate the axial thickness of the joint lens $L_1$, the axial thickness of the biconvex positive lens $L_3$, the Abbe number of the positive lense in the joint lens $L_1$ and the Abbe number of the biconvex positive lens $L_3$.

The conditional expression (7) relates to the correction of spherical aberration. The spherical aberration is excessively corrected over the upper limit of the conditional expression (7), and on the contrary, the spherical aberration is insufficiently corrected under the lower limit of the conditional expression (7).

The conditional expressions (8) and (9) are used to properly correct comatic aberration all over the angle of view.

The conditional expression (8) relates to the correction of the comatic aberration with respect to a ray having a small angle of view. Outward comatic aberration is conspicuously caused with respect to the ray having the small angle of view over the upper limit of the conditional expression (8), and on the contrary, inward comatic aberration is conspicuously caused with respect to the ray having the small angle of view under the lower limit of the conditional expression (8).

The conditional expression (9) mainly relates to the correction of comatic aberration with respect to a ray having a wide angle of view. Inward comatic aberration is conspicuously caused with respect to the wide angle of view under the lower limit of the conditional expression (9), and on the contrary, the axial thickness $d_4$ of the biconvex positive lens $L_3$ is too large and the lens system is large over the upper limit of the conditional expression (9).

The conditional expression (10) relates to the correction of abaxial chromatic aberration. The abaxial chromatic aberration is insufficiently corrected compared with the axial chromatic aberration over the upper limit of the conditional expression (10), and on the contrary, the abaxial chromatic aberration is excessively corrected under the lower limit of the conditional expression (10).

Figure 2:
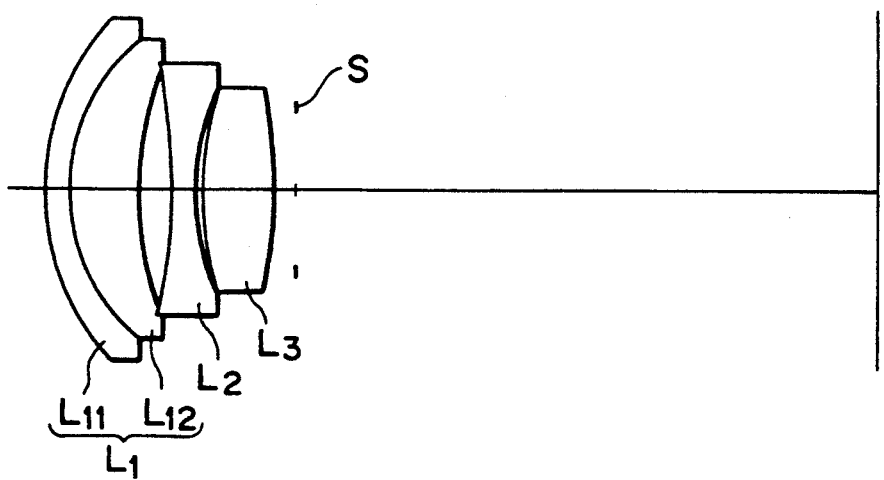
Figure 3:
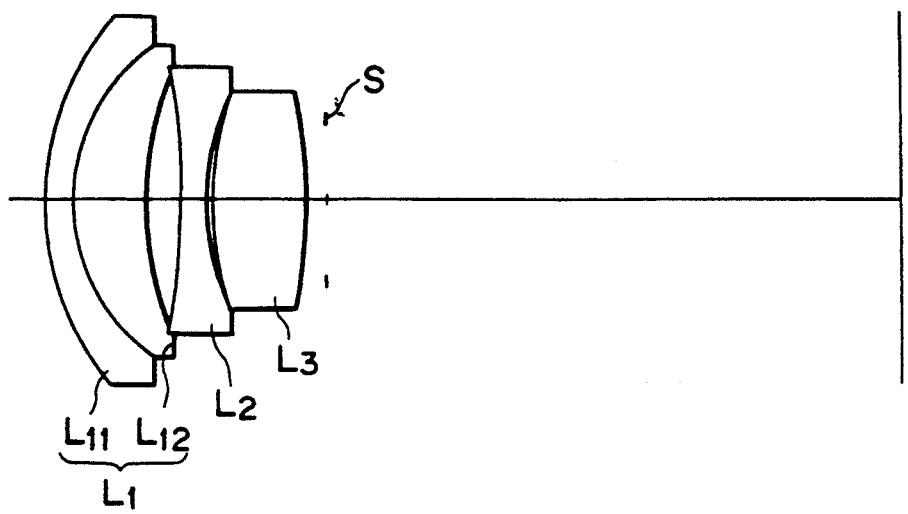
Figure 4:
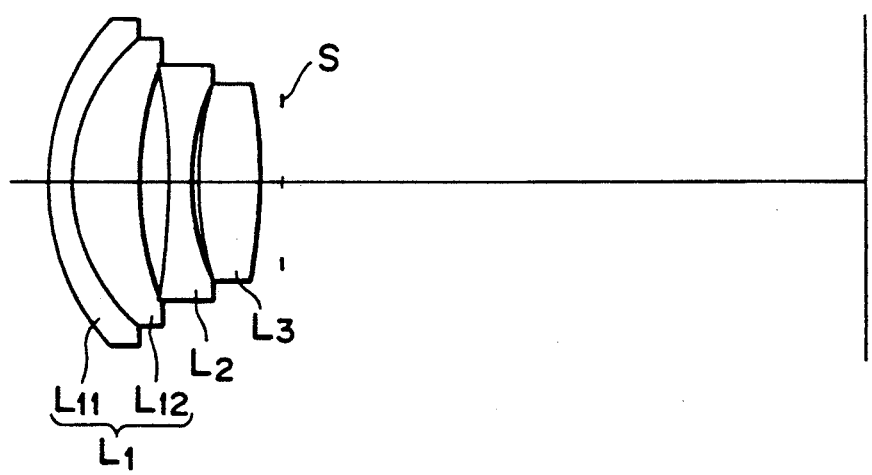

FIGS. 1, 2, 3 and 4 are construction views of lenses according to first, second, third and fourth embodiments of the present invention respectively.

The lenses according to the embodiments each have a wide angle of view which reaches 74°, and are basically composed of the positive lens $L_1$ formed by joining the negative meniscus lens $L_{11}$ whose convex surface faces the object and the positive meniscus lens $L_{12}$ whose convex surface similarly faces the object, the biconcave negative lens $L_2$, the biconvex positive lens $L_3$ and the aperture stop S.

The following Tables 1 to 4 show data on the lenses according to the first to fourth embodiments of the present invention respectively.

In the following tables, the leftmost numerals denote the order of positions of the lenses from the object. r, d and ν denote the radius of curvature of the lens surface, the lens surface interval and the Abbe number. n, f, Bf, FN, 2A, TL and AC denote the refractive index on the d line ($\lambda = 587.6$ nm), the focal length of the whole system, the back focus, the F number, the angle of view, the telephoto ratio (total length of lens/focal length), and the total length of the lens when the size of the image plane is 1, respectively.

The total length of the lens means the length along the optical axis between the first surface and the image surface.

TABLE 1

(First Embodiment)
f = 100.00   Bf = 78.90   FN = 4.0
2A = 73.8°   TL = 1.129   AC = 0.752

|   | r | d | ν | n |
|---|---|---|---|---|
| 1 | 34.871 | 3.47 | 40.7 | 1.58144 |
| 2 | 24.954 | 9.72 | 52.3 | 1.74810 |
| 3 | 47.241 | 4.51 | | |
| 4 | −88.234 | 3.47 | 31.1 | 1.68893 |
| 5 | 31.556 | 1.04 | | |
| 6 | 44.125 | 11.81 | 39.6 | 1.80450 |
| 7 | −71.753 | (Bf) | | |

TABLE 2

(Second Embodiment)
f = 100.00   Bf = 80.78   FN = 4.0
2A = 74.4°   TL = 1.111   AC = 0.728

|   | r | d | ν | n |
|---|---|---|---|---|
| 1 | 33.189 | 3.17 | 40.7 | 1.58144 |
| 2 | 25.450 | 9.17 | 54.7 | 1.72916 |
| 3 | 47.291 | 4.23 | | |
| 4 | −77.474 | 3.17 | 31.1 | 1.68893 |
| 5 | 33.046 | 1.06 | | |
| 6 | 48.026 | 9.52 | 39.6 | 1.80454 |
| 7 | −65.094 | (Bf) | | |

TABLE 3

(Third Embodiment)
f = 100.00   Bf = 78.72   FN = 4.0
2A = 73.6°   TL = 1.136   AC = 0.756

|   | r | d | ν | n |
|---|---|---|---|---|
| 1 | 36.740 | 3.82 | 47.2 | 1.54072 |
| 2 | 24.809 | 9.72 | 49.6 | 1.77250 |
| 3 | 46.397 | 4.51 | | |
| 4 | −92.655 | 3.47 | 28.3 | 1.72825 |
| 5 | 31.467 | .90 | | |
| 6 | 42.608 | 12.50 | 37.3 | 1.83400 |
| 7 | −73.824 | (Bf) | | |

TABLE 4

(Fourth Embodiment)
f = 100.00   Bf = 80.21   FN = 4.0
2A = 72.8°   TL = 1.088   AC = 0.719

|   | r | d | ν | n |
|---|---|---|---|---|
| 1 | 31.250 | 3.15 | 34.6 | 1.63980 |
| 2 | 24.476 | 9.09 | 54.7 | 1.72916 |
| 3 | 44.069 | 3.85 | | |
| 4 | −78.117 | 3.15 | 30.0 | 1.69895 |
| 5 | 32.546 | .94 | | |
| 6 | 47.466 | 8.39 | 37.3 | 1.83400 |
| 7 | −68.258 | (Bf) | | |

The following Table 5 shows conditioned response numerals according to the embodiments of the present invention.

TABLE 5

(Conditioned Response Numerals)

| CONDITION | EMBODIMENT | | | |
|---|---|---|---|---|
|  | 1 | 2 | 3 | 4 |
| $\Sigma d$ | 0.340 | 0.303 | 0.349 | 0.286 |
| $f_1/f_3$ | 2.843 | 2.765 | 2.983 | 2.832 |
| $d_3/d_5$ | 4.323 | 3.991 | 5.011 | 4.074 |
| $\Sigma N_p - \Sigma N_n$ | 0.282 | 0.263 | 0.338 | 0.224 |
| $d_5/f$ | 0.010 | 0.111 | 0.009 | 0.009 |
| $r_1/r_3$ | 0.738 | 0.702 | 0.792 | 0.709 |
| $r_4/r_7$ | 1.230 | 1.190 | 1.255 | 1.144 |
| $d_{12}/f$ | 0.132 | 0.123 | 0.135 | 0.122 |
| $d_6/f$ | 0.118 | 0.095 | 0.125 | 0.084 |
| $\nu_2-\nu_4$ | 12.65 | 15.05 | 12.26 | 17.31 |

The lens data shown in the above Tables 1 to 4 reveal that an extremely compact shape of the lens is maintained in spite of the wide angle of view thereof.

In order to describe the above specifically, the present invention is compared with the first embodiment disclosed in Japanese Patent Application Laid-Open No. 58-166314 which outwardly has the same structure as that of the present invention. In this example for comparison, the telephoto ratio is 1.138 and the total length of the lens is 0.940 when the image size is 1. On the other hand, although the present invention is equivalent to the example in telephoto ratio, the total length thereof in the actual use state is reduced by approximately thirty percent.

Therefore, it is evident that the lens of the present invention is made sufficiently compact.

The focusing of the lens of the present invention can obtain a satisfactory short range performance by fixing the aperture stop S and letting the lenses $L_1$ to $L_4$ out as a unit. It is needless to say that the aperture stop S may be also moved together with the joint lens $L_1$ to the biconvex lens $L_4$ as a unit.

As described above, according to the present invention, it is possible to achieve an extremely compact behind stop wide angle lens which has a simple structure, that is, four lenses in three groups, a wide angle of view which reaches 74° while securing a sufficient marginal illumination, and an excellent imaging performance.

Furthermore, since the lens of the present invention is a behind stop type, it is extremely easy to change the focal length by the attachment of a rear converter lens thereto. Thereby, it is possible to cope with the increase of focuses of the picture-taking lens.

I claim:

1. A behind stop wide angle lens comprising a positive lens $L_1$ formed by joining a negative meniscus lens $L_{11}$ whose convex surface faces an object and a positive meniscus lens $L_{12}$ whose convex surface faces the object, a biconcave negative lens $L_2$, a biconvex positive lens $L_3$ and an aperture stop S, disposed in this order from the object side, and meeting the following conditions:

$$0.27f < \Sigma d < 0.37f \qquad (1)$$

$$2.6 < f_1/f_3 < 4.0 \qquad (2)$$

$$3.8 < d_3/d_5 < 5.5 \qquad (3)$$

$$0.2 < \Sigma N_p - \Sigma N_n < 0.35 \qquad (4),$$

wherein f, $f_1$ and $f_3$ designate the focal length of the whole system, the focal length of said joint lens $L_1$ and the focal length of said biconvex positive lens $L_3$, respectively, and $\Sigma d$, $d_3$, $d_5$, $\Sigma N_p$ and $\Sigma N_n$ designate the distance between a surface in said lens system nearest to the object and a surface nearest to an image along the optical axis, the axial air space between said joint lens $L_1$ and said biconcave negative lens $L_2$, the axial air space between said biconcave negative lens $L_2$ and said biconvex positive lens $L_3$, the total refractive index of the positive lenses in the lens system, and the total refractive index of the negative lenses in the lens system, respectively.

2. A behind stop wide angle lens according to claim 1, wherein the axial air space $d_5$ between said biconcave negative lens $L_2$ and said biconvex positive lens $L_3$ meets the following condition:

$$d_5 < 0.015 f \tag{5}$$

3. A behind stop wide angle lens according to claim 1, further meeting the following condition:

$$0.7 < r_1/r_3 < 0.8 \tag{6}$$

wherein $r_1$ and $r_3$ designate the radii of curvature of the object side surface and image side surface of said joint lens $L_1$, respectively.

4. A behind stop wide angle lens according to claim 1, further meeting the following conditions:

$$1.1 < r_4/r_7 < 1.3 \tag{7}$$

$$0.12 < d_{12}/f < 0.14 \tag{8}$$

$$0.07 < d_6/f < 0.14 \tag{9}$$

$$11 < \nu_2 - \nu_4 < 20 \tag{10}$$

wherein $r_4$ and $r_7$ designate the radius of curvature of the object side surface of said biconcave negative lens $L_2$, and the radius of curvature of the image side surface of said biconvex positive lens $L_3$, respectively, and $d_{12}$, $d_6$, $\nu_2$ and $\nu_4$ designate the axial thickness of said joint lens $L_1$, the axial thickness of said biconvex positive lens $L_3$, the Abbe number of the positive lens in said joint lens $L_1$ and the Abbe number of said biconvex positive lens $L_3$, respectively.

* * * * *